US 6,671,778 B2

(12) United States Patent
Naberhuis et al.

(10) Patent No.: US 6,671,778 B2
(45) Date of Patent: Dec. 30, 2003

(54) ATOMIC RESOLUTION STORAGE DEVICE CONFIGURED AS A REDUNDANT ARRAY OF INDEPENDENT STORAGE DEVICES

(75) Inventors: Steven Louis Naberhuis, Fremont, CA (US); Kenneth J. Eldredge, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 144 days.

(21) Appl. No.: 09/922,436

(22) Filed: Aug. 3, 2001

(65) Prior Publication Data

US 2003/0028725 A1 Feb. 6, 2003

(51) Int. Cl.$^7$ ........................... G06F 12/00; G06F 13/00
(52) U.S. Cl. ....................... 711/114; 711/165; 361/760; 365/151; 365/118
(58) Field of Search .................. 711/4, 105, 114, 711/165; 365/118, 128, 151, 217, 237; 369/100, 101; 361/760

(56) References Cited

U.S. PATENT DOCUMENTS

| | | | |
|---|---|---|---|
| 5,557,596 A | * | 9/1996 | Gibson et al. ............ 369/101 |
| 6,172,902 B1 | * | 1/2001 | Wegrowe et al. ......... 365/158 |
| 6,275,410 B1 | * | 8/2001 | Morford .................. 365/151 |
| 6,404,647 B1 | * | 6/2002 | Minne' ................... 361/760 |

OTHER PUBLICATIONS

Storage Systems Overview, http://web.archive.org/web/200008160002540/http://hpl.hp.com/research/storage.html, pp. 1–3 Aug. 16, 2000.*

R. Morochove, "A Quantum Leap Forward in Storage Capacity", http://morochove.com/watch/cw/ff90930.htm, pp. 1–3, Sep. 30, 1999.*

HP Flaunts New Tech To Raise Lab Profile, CNET News — Enterprise Computing, http://web/archive.org/web/20000607003723/news.cnet.com/news/0–1003–200–1430874.html, pp. 1–6, New. 5, 1999.*

Charles C. Morehouse, "A Vision of Ultra–High Density Memory", IEEE International Conference on Nonvolatile Memory Technology, pp. 30–33, Jun. 1996.*

R.T. Howe et al., "Silicon Micromechanics: Sensors and Actuators on a Chip," IEEE Spectrum, pp. 29–35 (Jul. 1990).

E. Huber et al., "Laser–Induced Crystallization of Amorphous GeTe: A Time–Resolved Study," Physics Review B, vol. 36, No. 3, pp. 1595–1604 (Jul. 15, 1987).

IBM "Information Brief," 6 pages, (1998) < http://www.pc.ibm.com/us/infobrf/raidfin.html>.

(List continued on next page.)

Primary Examiner—Reginald G. Bragdon
Assistant Examiner—Pierre M. Vital

(57) ABSTRACT

A redundant array of independent storage devices is disclosed herein. The redundant storage device includes one or more atomic resolution storage devices and a control system. The atomic resolution storage device is configured to communicate with the control system as a redundant array of independent storage devices. Each atomic resolution storage device is a non-volatile memory component including a plurality of electron emitters, a medium having medium partitions, and a plurality of micromovers wherein each micromover is independently operable to move a medium partition relative to one or more electron emitters for redundant reading and writing of data at the media.

42 Claims, 10 Drawing Sheets

OTHER PUBLICATIONS

V.P. Jaecklin et al., "Novel Polysilicon Comb Actuators for XY–Stages", Proceedings of Micro Electro Mechanical Systems, pp. 147–149 (Feb. 1992).

G.W. Jones et al., "Silicon Field Emission Transistors and Diodes," IEEE Trans. on Components, Hybrids and Manufacturing Technology, vol. 15, No. 6, pp. 1051–1055 (Dec. 1992).

Raid Solutions "Raid.edu," Advanced Computer & Network Corporation, 20 pages, (2000). < http://www.acnc.com/raid.html>.

C.A. Spindt et al., "Physical Properties of Thin–Film Field Emission Cathodes with Molybdenum Cones," Journal of Applied Physics, vol. 47, No. 12, pp. 5248–5263 (Dec. 1976).

* cited by examiner

ATOMIC RESOLUTION STORAGE DEVICE CONFIGURED AS A REDUNDANT ARRAY OF INDEPENDENT STORAGE DEVICES

THE FIELD OF THE INVENTION

The present invention relates to a redundant array of independent storage devices, and in particular, to a storage system including one or more atomic resolution storage devices configured as a redundant array of independent storage devices. The storage system is suitable for use as part of an appliance.

BACKGROUND OF THE INVENTION

In the hard disk drive industry, RAID (short for redundant array of independent disks) systems employ two or more disk drives in combination for improved disk drive fault tolerance and disk drive performance. RAID systems stripe a user's data across multiple hard disks. When accessing data, the RAID system allows all of the hard disks to work at the same time, providing a large increase in speed and reliability.

A RAID system configuration is defined by different RAID levels. The different RAID levels range from level 0 which provides data striping (spreading out of data blocks of each file across multiple hard disks) resulting in improved disk drive speed and performance but no redundancy. RAID LEVEL 1 provides disk mirroring, resulting in 100% redundancy of data through mirrored pairs of hard disks (i.e., identical blocks of data written to two hard disks). Other disk drive RAID levels provide variations of data striping and disk mirroring, and also provide improved error correction for increased performance and fault tolerance.

In the past, RAID disk drive systems have been typically limited to use on server systems, and generally have not been employed for single personal or business computer use. Although RAID disk drive systems provide an increase in fault tolerance and performance, since RAID systems employ multiple hard disk drives, they result in additional disk drive cost and space requirements relative to a single hard disk drive. Further, the power requirements for a RAID system dramatically increase with the addition of each RAID disk drive and the requirement of a RAID host controller. As such, RAID disk drive systems have not been employed to a large extent for use for appliances or personal computing devices.

SUMMARY OF THE INVENTION

The present invention provides a redundant storage system including one or more atomic resolution storage (ARS) devices and a control system. The atomic resolution storage device is configured to communicate with the control system as a redundant array of independent storage devices. The atomic resolution storage device is a non-volatile memory component including a plurality of electron emitters, a medium having medium portions, and a plurality of micromovers wherein each micromover is independently operable to move a media partition relative to one or more electron emitters for redundant reading and writing of data at the media. In one aspect, the redundant array of independent storage device(s) is located on a single, semiconductor unit. In another aspect, a multiplicity of ARS devices are configured as a redundant array of independent storage devices in a redundant storage system.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Within the drawings, like numbers designate like elements.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
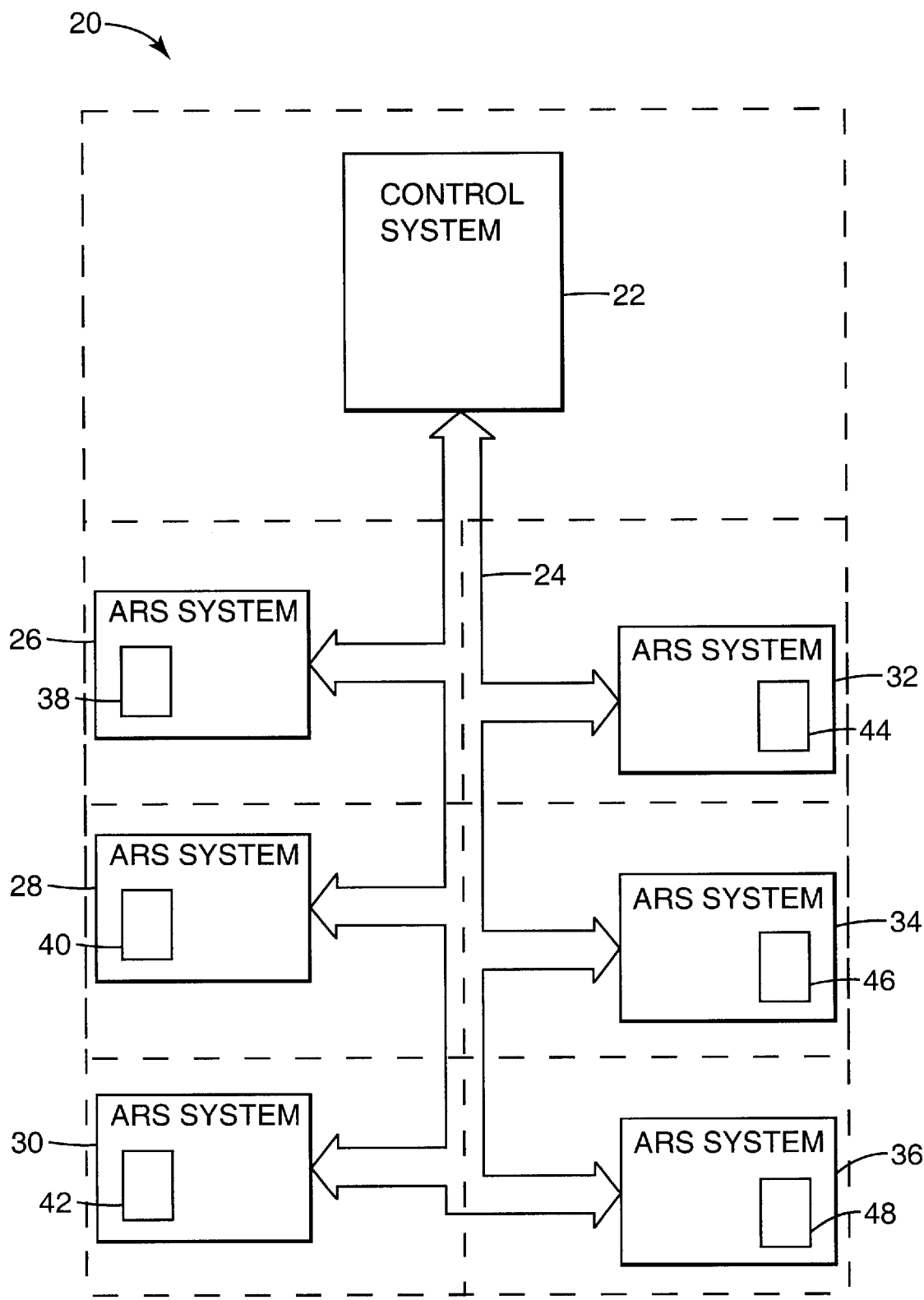
FIG. 1 is a block diagram illustrating an exemplary embodiment of a redundant array of independent storage devices (RAIsD) data storage system including a plurality of atomic resolution storage devices configured as a RAIsD system according to the present invention.

In FIG. 1, one exemplary embodiment of a redundant array of independent storage devices (RAIsD) data storage system according to the present invention is generally shown at 20. The RAIsD data storage system 20 includes a controller or control system and a plurality of atomic resolution storage (ARS) systems. The atomic resolution storage systems are configured to communicate with the controller as a redundant array of independent storage devices, similar to a RAID system. The RAIsD system 20 provides a redundant array of high resolution storage devices which are relatively low cost and require very little space, being located on one or more silicon units, relative to a hard disk RAID system. The RAIsD system utilizing atomic resolution storage systems according to the present invention dramatically decreases the power and space requirements relative to known hard disk drive systems.

The RAIsD data storage system 20 includes one or more atomic resolution storage devices. Each atomic resolution storage device includes a non-volatile memory component employing a plurality of electron emitters, one or more medium surfaces and one or more micromover(s). In one embodiment, each electron emitter is positioned near an associated partitioned area on the medium surface. The corresponding micromover provides for movement of the electron emitter relative to the medium surface to aid in the redundant reading and writing of data at multiple partitioned areas on the medium surface. In one aspect, the micromover is attached to the corresponding partitioned area of the medium and the corresponding electron emitter is held stationary, for movement of the medium relative to the electron emitter. Exemplary embodiments of atomic resolution storage devices suitable for use as a RAIsD storage system according to the present invention are disclosed in detail in this application.

Each atomic resolution storage device used in the present invention is small in size, has low power requirements, and provides for non-volatile, high density storage of data. The term "atomic resolution storage device" as used herein, is defined as a non-volatile memory storage device or component capable of storing a large volume of data, such as megabytes to gigabytes of data points, within a relatively small storage area and requiring very low power consumption. Each atomic resolution storage device includes a plurality of electron emitters, a storage medium, and one or more micromovers and associated circuitry for the redundant reading and writing of data at the storage medium. The terms medium and media are used interchangeably herein when used in reference to a storage area. In one preferred embodiment, each atomic resolution storage device includes a plurality of spaced apart electron emitters, wherein each electron emitter is responsible for a number of storage areas on the storage medium. Suitable electron emitter include flat emitters and tip emitters. Other electron emitters types may become apparent to one skilled in the art after reading the present application.

The RAIsD data storage system 20 may comprise a single atomic resolution storage device configured to operate as a redundant array of independent storage devices. Alternatively, the RAIsD data storage system includes a plurality of atomic resolution storage devices configured to operate as a redundant array of independent storage devices. The plurality of atomic resolution storage devices may be located on a single semiconductor unit (e.g., a chip) or may be located on separate semiconductor units linked to a control system (e.g., a host controller) via a communication bus.

In one embodiment, the atomic resolution storage device is less than 1 cm wide by 1 cm high by less than 2 millimeters long, having a data storage capability of hundreds of megabytes to hundreds of gigabytes and power requirements of less than one watt (instantaneously) and tenths of milliwatts (standby). The atomic resolution storage device size, storage capacity and power requirements allow it to be usable as a RAID data storage system (e.g., RAID LEVEL 0, 1, 2, 3, 4, 5 or 6) within an appliance as will be described later in this application. Each separate, partitioned storage location is capable of storing gigabytes of data, independent of other storage areas. Further, with the atomic resolution storage device configured to operate as a RAIsD system, a highly reliable data storage system can be provided on a single semiconductor unit or chip.

An atomic resolution storage device suitable for use in a RAIsD system according to the present invention is disclosed in U.S. Pat. No. 5,557,596 to Gibson et al., issued Sep. 17, 1996, entitled "Ultra-High Density Storage Device," which is incorporated herein by reference. Other suitable high density storage atomic resolution storage devices suitable for use within the RAIsD system according to the present invention will become apparent to those skilled in the art after reading the present application. One exemplary embodiment of a suitable high density atomic resolution storage devices suitable for use present invention is disclosed in further detail later in this application.

In the exemplary embodiment shown, RAIsD storage system 20 includes multiple ARS systems and a controller logically connected to a common communications bus. Each ARS system includes an ARS device or component. In particular, RAIsD storage system 20 includes a control system 22, a communications bus 24, an atomic resolution storage system 26, an atomic resolution storage system 28, an atomic resolution storage system 30, an atomic resolution storage system 32, an atomic resolution storage system 34 and an atomic resolution storage system 36. Control system 22 and atomic resolution storage systems 26, 28, 30, 32, 34 and 36 are each connected to the communications bus 24, and accordingly, communicate with each other via the communications bus 24 using a communication bus protocol. It is recognized that other devices or peripherals may also be connected to the communication bus 24 (e.g., a printer, a modem, etc.).

In one exemplary embodiment, communications bus 34 is defined as an industry standard ATA or uniform serial bus (USB) communication bus for allowing multiple devices to communicate on a common bus. In one exemplary embodiment, communications bus 24 uses a bus protocol and hardware interface to allow control system 22 and atomic resolution storage systems 26, 28, 30, 32, 34 and 36 to communicate as a RAIsD system across the same bus. Other communication buses suitable for use with the RAIsD storage system according to the present invention will become apparent to one skilled in the art after reading the present application.

Control system 22 includes a microprocessor-based data processing system or other system capable of performing a sequence of logical operations. Each atomic resolution storage system 26, 28, 30, 32, 34 and 36 includes a corresponding atomic resolution storage device 38, 40, 42, 44, 46 and 48. Each atomic resolution storage system 26, 28, 30, 32, 34, 36 further includes a control system and corresponding electronics which is connected to the communications bus 24 allowing control system 22 to communicate with corresponding atomic resolution storage devices 38, 40, 42, 44, 46, 48. The ARS storage system controller and associated electronics may be located on the corresponding atomic resolution storage device 38, 40, 42, 44, 46, 48, or may be separately located within or outside of each corresponding atomic resolution storage system 26, 28, 30, 32, 34 and 36. The atomic resolution storage systems 26, 28, 30, 32, 34, 36 are configured to communicate with control system 22 as RAIsD storage system 20 similar to the redundancy techniques used in RAID disk drives systems (e.g., a RAID LEVEL 0, RAID LEVEL 1, RAID LEVEL 2, etc. configuration), for highly reliable, redundant storage of data. Control system 22 may further include a cache system, queuing, and other systems, components or devices to aid in the execution of read and write commands (i.e., the reading and writing of data) within RAIsD system 20.

In one exemplary embodiment, storage system 20 is configured to operate as a RAID LEVEL 1 system known in the disk drive industry. The storage system 20 provides data storage mirroring in ARS system pairs. In particular, the data stored in ARS system 26 is stored (i.e. mirrored) in ARS system 32. The data stored in ARS system 28 is stored in ARS system 34. The data stored in ARS system 30 is stored in ARS system 36. Alternatively, ARS systems 26, 28, 30, 32, 34, 36 can be configured to communicate with control system 22 as other RAID storage systems, such as a RAID LEVEL 0, RAID LEVEL 2, RAID LEVEL 3, RAID LEVEL 4, RAID LEVEL 5, RAID LEVEL 6, etc. Other suitable examples of RAID configurations usable with the storage system according to the present invention are disclosed at http://www.pc.ibm.com, entitled "Information Brief, IntelliStation RAID Technology"; and http://www.acnc.com/raid.html, entitled "RAID.edu", both the disclosures of which are incorporated herein by reference. The RAIsD storage system having multiple atomic resolution storage systems can also be used in combination with an array of hard disk drives (e.g., microdrives).

Figure 2:
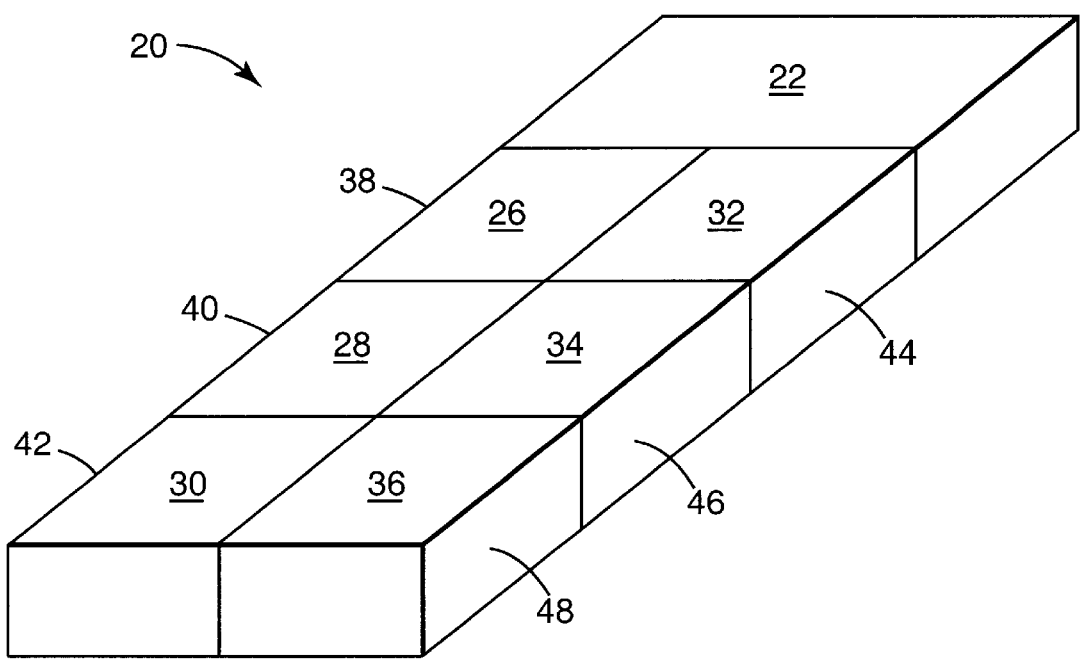
FIG. 2 is a diagram illustrating one exemplary embodiment of the RAIsD storage system according to the present invention shown in FIG. 1, located on a single semiconductor unit.

FIG. 2 is a perspective view illustrating one exemplary embodiment of a RAIsD storage system according to the present invention, wherein a plurality of atomic resolution storage devices are located on a single semiconductor unit or multiple semiconductor units connected together. In the exemplary embodiment shown, atomic resolution storage systems 26, 28, 30, 32, 34 and 36 are located on a single unit, and include corresponding atomic resolution storage devices 38, 40, 42, 44, 46 and 48. Additionally, control system 22 is also located on the same unit. In one preferred embodiment, RAIsD storage system 20 is a silicon based chip manufactured using silicon semiconductor processing techniques. In another embodiment, control system 22 is located separate (e.g., on a separate unit or component chip) from atomic resolution storage systems 26, 28, 30, 32, 34 and 36, but logically connected to a common communications bus (e.g., communications bus 24). Other semiconductor devices may also be located within each ARS system 26, 28, 30, 32, 34, 36 to aid in communicating with control system 22 and the execution of read and write commands, and in particular may be located on one or more ARS devices 38, 40, 42, 44, 46 and 48.

In one preferred embodiment, each atomic resolution storage device is capable of storing a large volume of data, such as megabytes to gigabytes of data points, within a relatively small storage area. Each atomic resolution storage device is a low power consumption storage device, requiring only about 0.1 watts to 1 watt or less to operate. In one preferred embodiment, each atomic resolution storage system or component has a size of about 25 millimeters squared to 1 centimeter squared.

Figure 3:
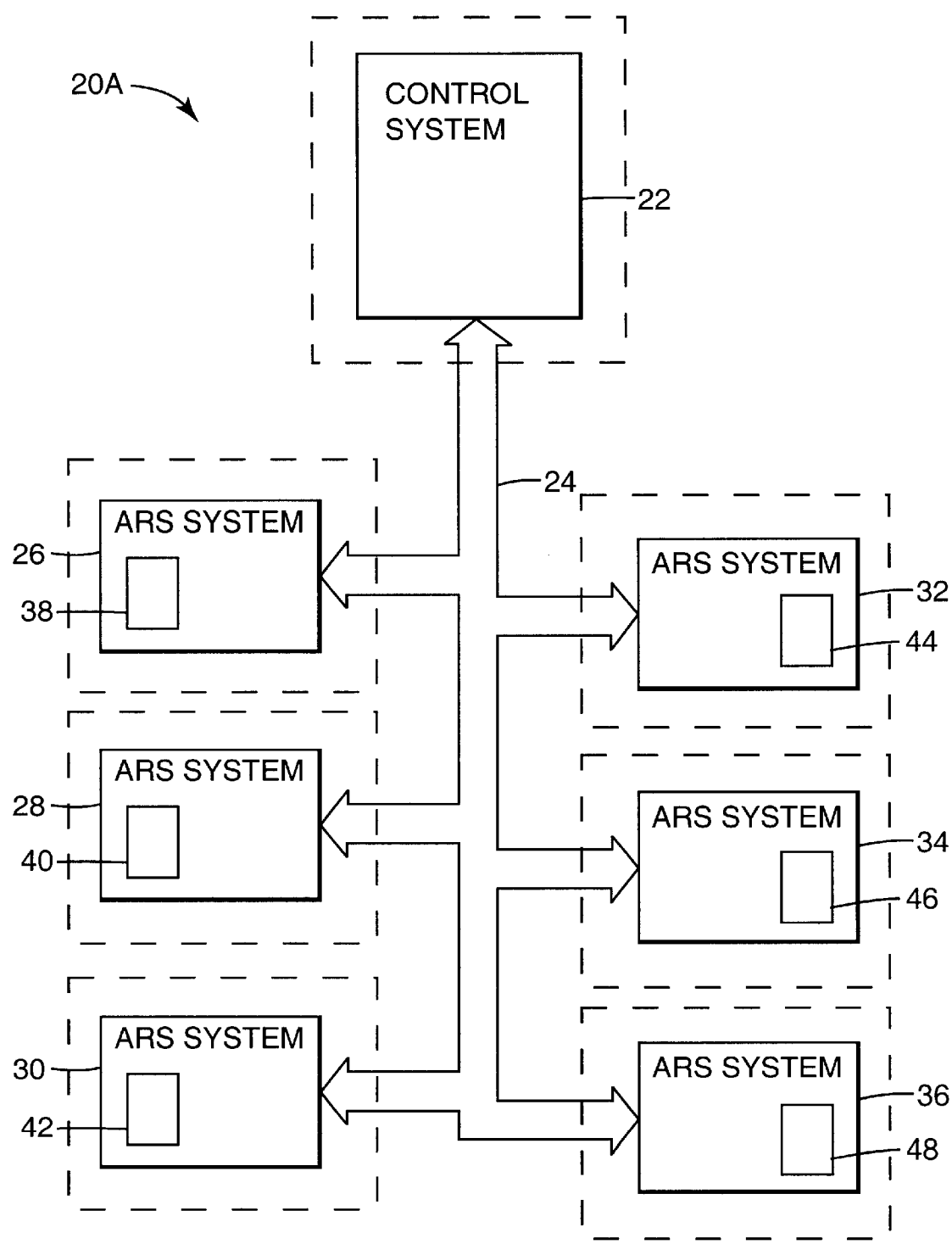
FIG. 3 is a block diagram illustrating another exemplary embodiment of a storage system according to the present invention employing one or more atomic resolution storage devices configured as a RAIsD system, wherein one or more of the atomic resolution storage devices are located on separate semiconductor chips.

FIG. 3 illustrates another exemplary embodiment of a RAIsD storage system according to the present invention at 20A, which is similar to the RAIsD storage system 20 previously described herein. In this embodiment, the control system 22, ARS system 26, ARS system 28, ARS system 30, ARS system 32, ARS system 34 and ARS system 36 are located separate from each other while being logically connected via a common bus, such as communications bus 24. In one aspect, control system 22 and ARS systems 26, 28, 30, 32, 34, 36 are each located on a separate semiconductor unit.

Figure 4:
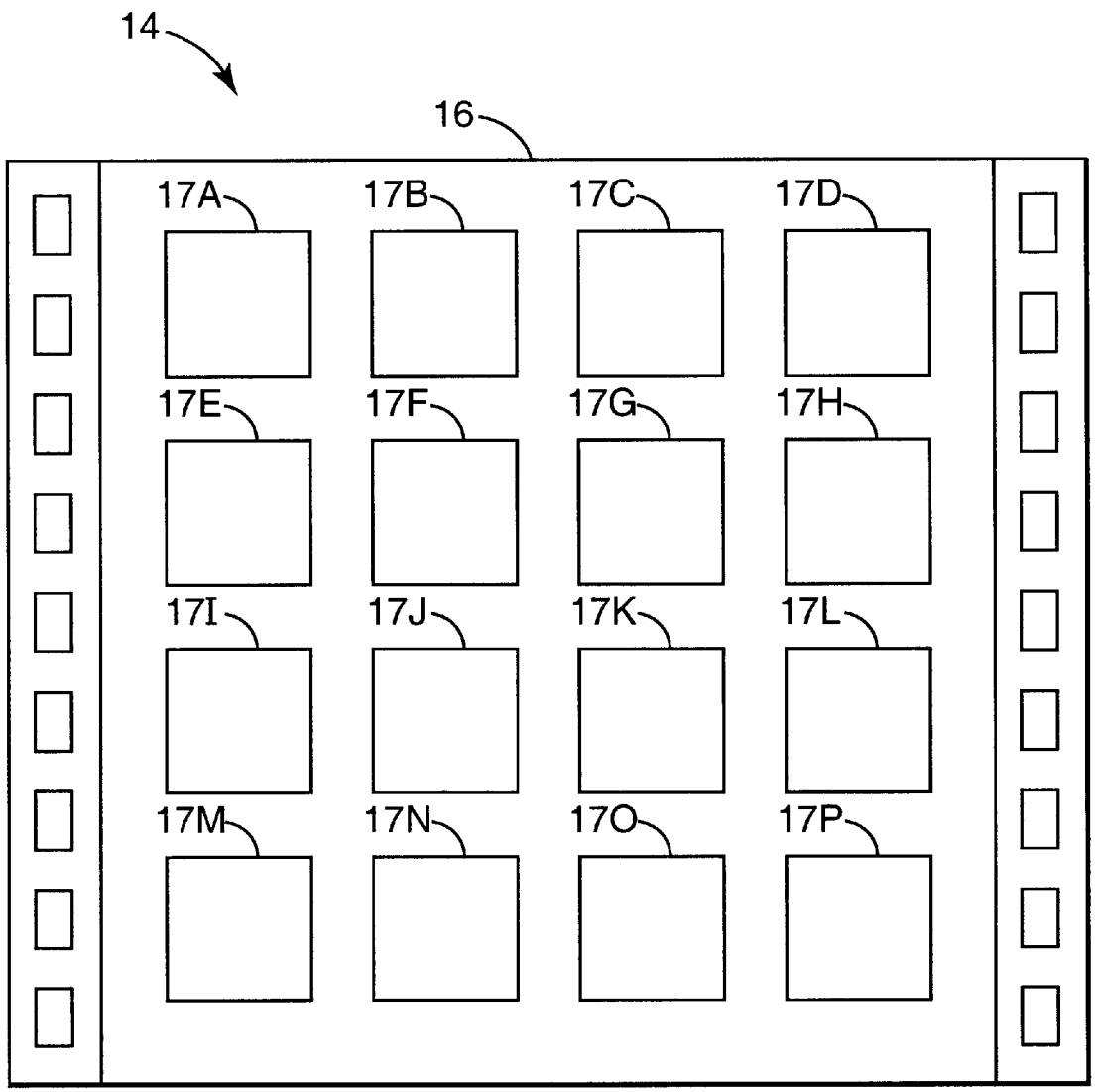
FIG. 4 is a diagram illustrating one exemplary embodiment of a RAIsD data storage system including an atomic resolution storage device configured as a RAIsD system, for use in an appliance according to the present invention.

FIG. 4 is a diagram illustrating one exemplary embodiment of a RAIsD data storage system 14 according to the present invention, wherein the RAIsD data storage system 14 is made of a single atomic resolution storage device 16. The atomic resolution storage device 16 is a non-volatile memory component which is configured as a redundant array of independent storage devices. In particular, the atomic resolution storage device 16 includes a plurality of electron emitters, storage areas, and micromovers, where each micromover moves a corresponding partitioned storage area relative to one or more electron emitter independent of other micromovers. In the exemplary embodiment shown, atomic resolution storage device 16 includes 16 independent micromovers 17 having a corresponding medium surface (i.e., partitioned areas) and one or more emitters, indicated at 17A, 17B, 17C, 17D, 17E, 17F, 17G, 17H, 17I, 17J, 17K, 17L, 17M, 17N, 17O and 17P. Each of the micromovers 17 are operable to move in a desired direction, independent of each other, allowing a single atomic resolution storage device 16 located on a single semiconductor unit to be able to operate as a redundant array of independent storage devices, for operation as a RAIsD system.

Figure 5:
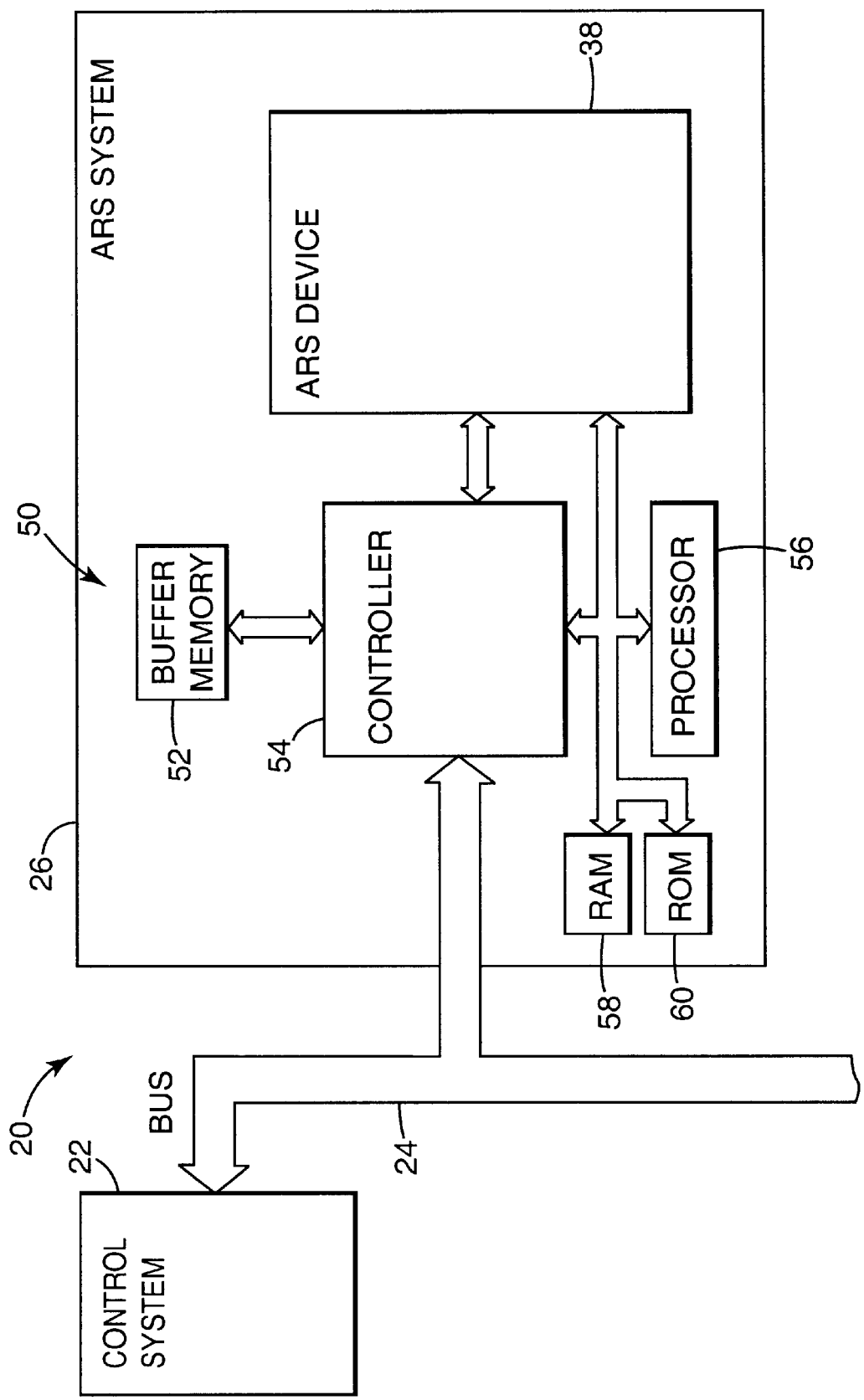
FIG. 5 is a block diagram illustrating one exemplary embodiment of a control system and ARS system target for a RAIsD storage system in accordance with the present invention.

In FIG. 5, a block diagram illustrating one embodiment of an ARS system is shown at ARS system 26. Although only ARS system 26 is described in detail, ARS systems 28, 30, 32, 34, 36 can be similar to ARS system 26 as detailed herein.

ARS system 26 includes an interface ARS device control system 50 which provides an intelligent control system interface for execution of read and write commands at ARS device 38. In particular, interface ARS control system 50 communicates with control system 22 via communications bus 24 by receiving commands and data from and transmitting status and data back to control system 22. Interface ARS control system 50 includes controller 54 (which includes one or more components) which controls a buffer memory 52 employed for storing data from control system 22 which is to be written to ARS device 38. In addition, controller 54 controls buffer memory 52 for storing data read from ARS device 38. Buffer memory 52 typically comprises volatile memory, such as dynamic random access memory (DRAM). Further, controller 54 sends data to and receives data from a read-write channel located in the controller 54. Controller 54 also provides for error correction and error detection on data read from ARS device 38.

An interface processor 56 handles the flow of data commands received by controller 54 by sending commands to and reading status from the controller 54. Interface processor 56 ascertains which commands to process from control system 22 and when to process these commands (i.e., command priority/queuing), and directs other tasks performed by controller 54. Control system 50 operational programs are stored in non-volatile memory 60, which may be read-only memory (ROM) or flash memory. Alternatively, system operational programs may be stored on ARS device 38. Upon start-up or power-up of ARS device 38, system operational programs, such as an ARS device control operational program, are transferred into volatile memory 58 for fast access by controller 54 for execution of read and write commands. In one aspect, the controller includes a protocol controller, host Direct Memory Access (DMA) engine, command queuing engine (CQE), buffer manager, data error correction, and microprocessor interface for interfacing between an ARS device and a communications bus.

Figure 6:
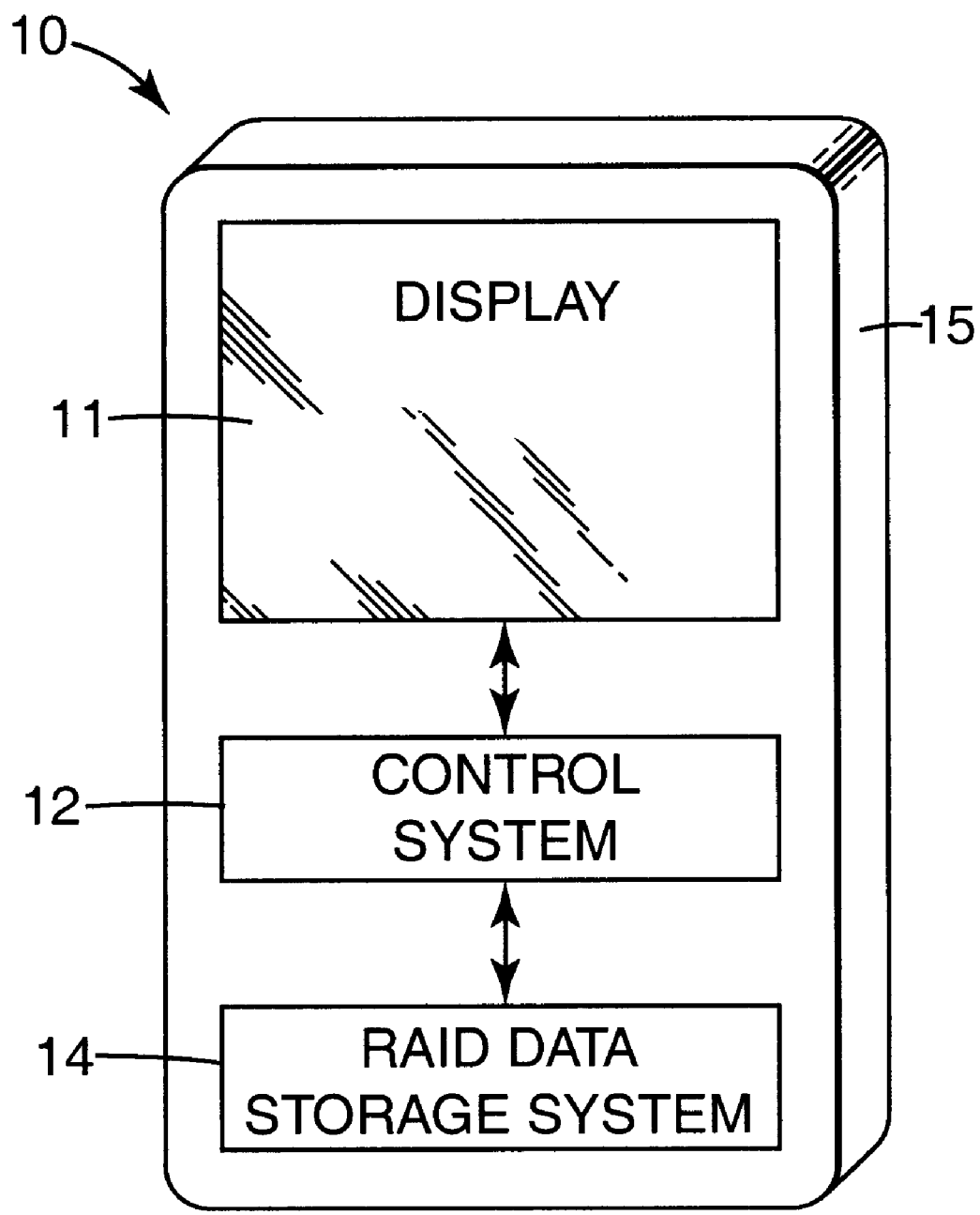
FIG. 6 is a diagram illustrating one exemplary embodiment of an appliance employing a redundant array of independent storage devices according to the present invention.

In FIG. 6, an appliance employing a redundant array of independent storage devices according to the present invention is generally shown at 10. The RAIsD data storage system employed by appliance 10 provides for reliable, secure non-volatile storage of data within the appliance. The term appliance, as used herein, refers to a microprocessor based electronic device, such as a personal digital assistant (PDA), a digital phone, an internet appliance, a personal or portable computer, a control panel, or similar device. The appliance 10 may or may not be portable. In particular, due to the small size and power requirements of the RAIsD data storage system, the RAIsD data storage system lends itself to use in small, portable computing devices, while providing the reliability and redundancy of larger, expensive RAID disk drive systems. The RAIsD data storage system may also be used as part of a larger system. The appliance 10 RAIsD data storage system employs an atomic resolution storage device or system which is configured to communicate with the appliance control system as a redundant array of independent storage devices, similar to the configuration of larger RAID disk drive systems, but able to be located on one or more semiconductor chips.

In one embodiment, appliance 10 includes a display 11, an appliance control system 12 and RAsD data storage system 14 located within appliance housing 15. In another embodiment, appliance 10 does not include a display. Appliance 10 can be operated via a user input, such as a push button control pad, a computer mouse, or other user input device. In one aspect, display 11 is a touch sensitive display such that appliance 10 is operated using display 11 in connection with a stylus or similar tool. In another aspect, appliance 10 does not include a display 11.

Control system 12 is responsive to display 11 or other user input devices for the reading and writing of data at RAIsD data storage system 14. RAIsD data storage system 14 is configured to communicate with the control system 12 as a redundant array of independent storage devices.

FIGS. 7 through 10 disclose one exemplary embodiment of an atomic resolution storage device configured for use in a RAIsD data storage system 14, and capable of storing megabytes to gigabytes of information in a small storage area, for an appliance. For a further discussion of an atomic resolution storage device, see U.S. Pat. No. 5,557,596, entitled, "Ultra-High Density Storage Device", by Gibson et al. and assigned to Hewlett-Packard Company, and U.S. patent application Ser. No. 09/617,876 (Si-Ty Lam et al., filed Jul. 17, 2000, entitled "Self-Aligned Electron Source Device") both of which have been incorporated herein by reference.

Figure 7:
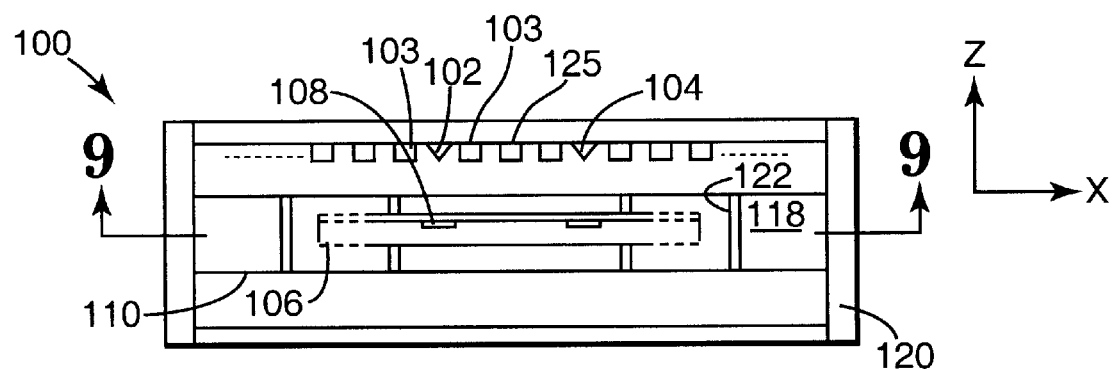
FIG. 7 is a side view illustrating one exemplary embodiment of an atomic resolution storage device used in a RAIsD storage system in accordance with the present invention.

FIG. 7 illustrates a side cross-sectional view of one exemplary embodiment of an atomic resolution storage device used in an appliance according to the present invention at 100. ARS storage device 100 is one exemplary embodiment of ARS storage devices 38, 40, 42, 44, 46, 48 used in RAIsD systems 14, 20, 20A. Storage device 100 includes a number of electron emitters, such as electron emitters 102 and 104, storage medium 106 including a number of storage areas, such as storage area 108, and micromover 110. Micromover 110 scans storage medium 106 with respect to the electron emitters or vice versa. In one preferred embodiment, each storage area is responsible for storing one bit of information.

In one embodiment, the electron emitters are point emitters having very sharp points. Alternatively, other electron emitters may be used (e.g., flat or planar electron emitters). Each point emitter may have a radius of curvature in the range of approximately 1 nanometer to hundreds of nanometers. During operation, a pre-selected potential difference is applied between an electron emitter and its corresponding gate, such as between electron emitter 102 and gate 103 surrounding it. Due to the sharp point of the emitter, an electron beam current is extracted from the emitter towards the storage area. Depending on the distance between the emitters and the storage medium 106, the type of emitters, and the spot size (bit size) required, electron optics may be utilized to focus the electron beams. A voltage may also be applied to the storage medium 106 to accelerate the emitted electrons and to aid in focusing the emitted electrons.

In one embodiment, casing 120 maintains storage medium 106 in a partial vacuum, such as at least $10^{-5}$ torr. It is known in the art to fabricate such types of microfabricated electron emitters in vacuum cavities using semiconductor processing techniques. See, for example, "Silicon Field Emission Transistors and Diodes," by Jones, published in IEEE Transactions on Components, Hybrids and Manufacturing Technology, 15, page 1051, 1992.

In the embodiment shown in FIG. 7, each electron emitter has a corresponding storage area. In another embodiment, each electron emitter is responsible for a number of storage areas. As micromover 110 scans storage medium 106 to different locations, each emitter is positioned above different storage areas. With micromover 110, an array of electron emitters can scan over storage medium 106.

As will be described, the electron emitters are responsible to read and write information on the storage areas by means of the electron beams they produce. Thus, electron emitters suitable for use in storage device 100 are the type that can produce electron beams that are narrow enough to achieve the desired bit density on the storage medium, and can provide the different power densities of the beams needed for reading from and writing to the medium. A variety of ways are known in the art that are suitable to make such electron emitters. For example, one method is disclosed in "Physical Properties of Thin-Film Field Emission Cathodes With Molybdenum Cones," by Spindt et al, published in the Journal of Applied Physics, Vol. 47, No. 12, December 1976. Another method is disclosed in "Fabrication and Characteristics of Si Field Emitter Arrays," by Betsui, published in Tech. Digest $4^{th}$ Int. Vacuum Microelectronics Conf., Nagahama, Japan, page 26, 1991.

In one embodiment, there can be a two-dimensional array of emitters, such as 100 by 100 emitters, with an emitter pitch of 5 to 50 micrometers in both the X and the Y directions. Each emitter may access tens of thousands to hundreds of millions of storage areas. For example, the emitters scan over the storage areas with a periodicity of about 1 to 100 nanometers between any two storage areas. Also, the emitters may be addressed simultaneously or sequentially in a multiplexed manner. Such a parallel accessing scheme significantly increases data rate of the storage device.

Figure 8:
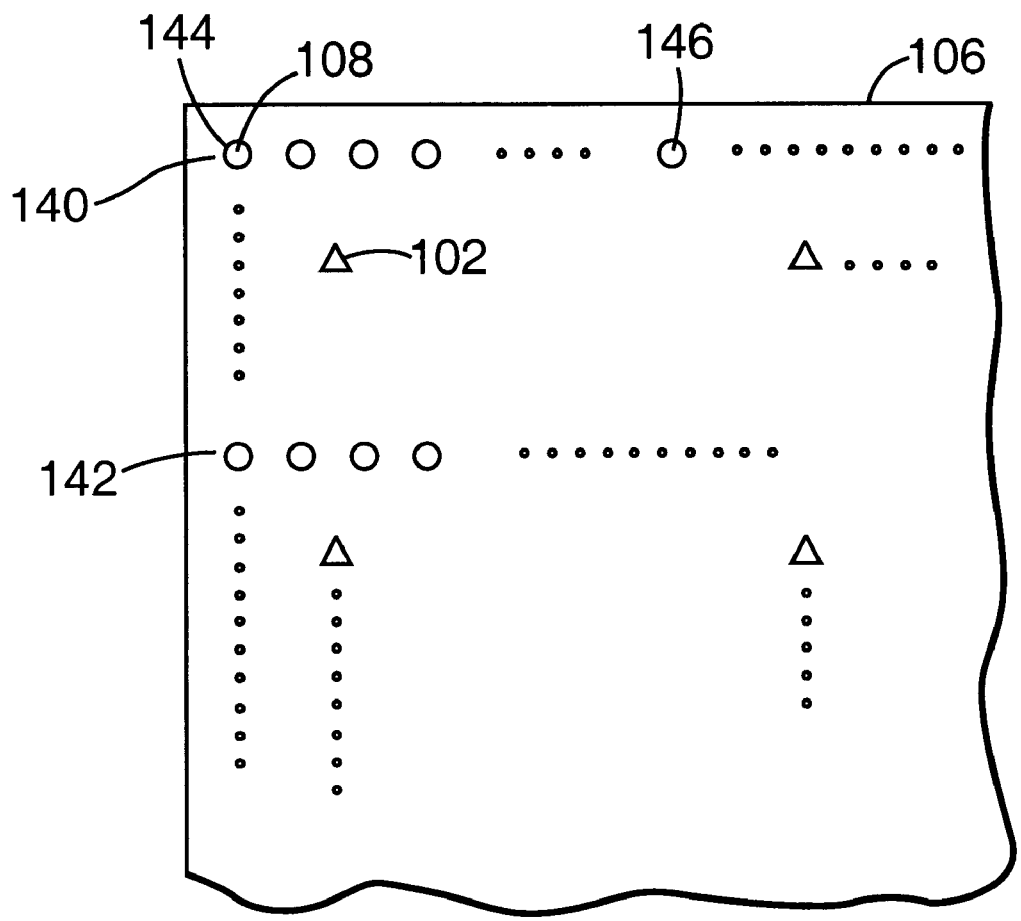
FIG. 8 is a simplified schematic diagram illustrating one exemplary embodiment of storing information within the atomic resolution storage device illustrated in FIG. 7.

FIG. 8 shows the top view of storage medium 100 having a two-dimensional array of storage areas and a two-dimensional array of emitters. Addressing the storage areas requires external circuits. One embodiment to reduce the number of external circuits is to separate the storage medium into rows, such as rows 140 and 142, where each row contains a number of storage areas. Each emitter is responsible for a number of rows. However, in this embodiment, each emitter is not responsible for the entire length of the rows. For example, emitter 102 is responsible for the storage areas within rows 140 through 142, and within columns 144 through 146. All rows of storage areas accessed by one emitter are connected to one external circuit. To address a storage area, one activates the emitter responsible for that storage area and moves that emitter by micromover 110 (shown in FIG. 6) to that storage area. The external circuit connected to the rows of storage areas within which that storage area lies is activated.

Micromover 110 can also be made in a variety of ways, as long as it has sufficient range and resolution to position the electron emitters over the storage areas. As a conceptual example, micromover 110 is fabricated by standard semiconductor microfabrication process to scan storage medium 106 in the X and Y directions with respect to casing 120.

Figure 9:
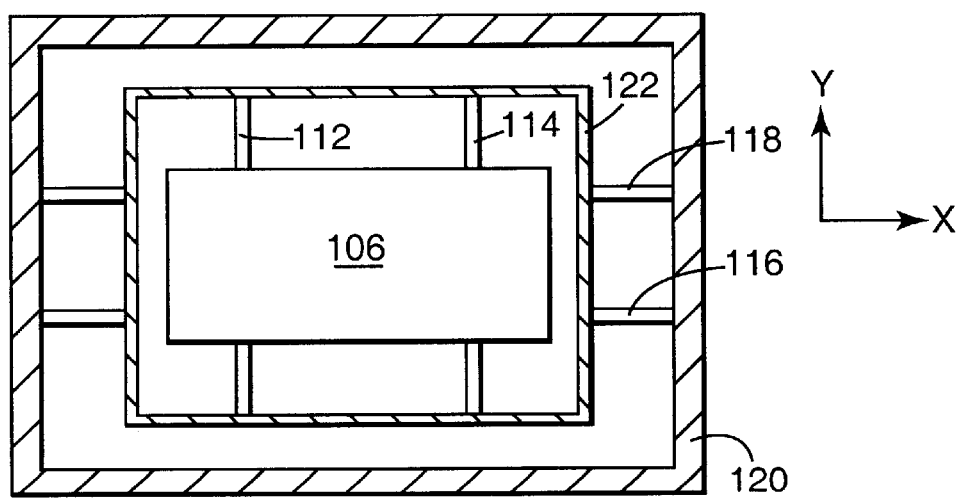
FIG. 9 is a top view illustrating one exemplary embodiment of an atomic resolution storage device used in a RAIsD storage system in accordance with the present invention, taken along lines 9—9 of FIG. 7.

FIG. 9 shows the top view of the cross section 9—9 in FIG. 7, illustrating storage medium 106 held by two sets of thin-walled microfabricated beams. The faces of the first set of thin-walled beams are in the Y-Z plane, such as 112 and 114. Thin-walled beams 112 and 114 may be flexed in the X direction allowing storage medium 106 to move in the X direction with respect to casing 120. The faces of the second set of thin-walled beams are in the X-Z plane, such as 116 and 118. Thin-walled beams 116 and 118 allow storage medium 106 to move in the Y direction with respect to casing 120. Storage medium 106 is held by the first set of beams, which are connected to frame 122. Frame 122 is held by the second set of beams, which are connected to casing 120. The electron emitters scan over storage medium 106, or storage medium 106 scans over the electron emitters in the X-Y directions by electrostatic, electromagnetic, piezoelectric, or other means known in the art. In this example, micromover 110 moves storage medium 106 relative to the electron emitters. A general discussion of such microfabricated micromover can be found, for example, in "Novel Polysilicon Comb Actuators for XY-Stages," published in the Proceeding of MicroElectro Mechanical Systems 1992, written by Jaecklin et al.; and in "Silicon Micromechanics: Sensors and Actuators on a Chip", by Howe et al., published in IEEE Spectrum, page 29, in July 1990.

In another embodiment, the electron beam currents are rastered over the surface of storage medium 106 by either electrostatically or electromagnetically deflecting them, such as by electrostatic deflectors or electrodes 125 (shown in FIG. 6) positioned adjacent to emitter 104. Many different approaches to deflect electron beams can be found in literature on Scanning Electron Microscopy and will not be further described in this specification.

In one method, writing is accomplished by temporarily increasing the power density of the electron beam current to modify the surface state of the storage area. Reading is accomplished by observing the effect of the storage area on the electron beams, or the effect of the electron beams on the storage area. For example, a storage area that has been modified can represent a bit 1, and a storage area that has not been modified can represent a bit 0, and vice versa. In fact, the storage area can be modified to different degrees to represent more than two bits. Some modifications may be permanent, and some modifications may be reversible. The permanently modified storage medium is suitable for write-once-read-many memory (WORM).

In one embodiment, the basic idea is to alter the structure of the storage area in such a way as to vary its secondary electron emission coefficient (SEEC), its back-scattered electron coefficient (BEC), or the collection efficiency for secondary or back-scattered electrons emanating from the storage area. The SEEC is defined as the number of secondary electrons generated from the medium for each electron incident onto the surface of the medium. The BEC is defined as the fraction of the incident electrons that are scattered back from the medium. The collection efficiency for secondary/back-scattered electrons is the fraction of the secondary/back-scattered electrons that is collected by an electron collector and typically registered in the form of a current.

Reading is typically accomplished by collecting the secondary and/or back-scattered electrons when an electron beam with a lower power density is applied to storage medium 106. During reading, the power density of the electron beam should be kept low enough so that no further writing occurs.

One embodiment of storage medium 106 includes a material whose structural state can be changed from crystalline to amorphous by electron beams. The amorphous state has a different SEEC and BEC than the crystalline state, which leads to a different number of secondary and back-scattered electrons emitted from the storage area. By measuring the number of secondary and back-scattered electrons, one can determine the stage of the storage area. To change from the amorphous to crystalline state, one increases the beam power density and then slowly decreases it. This heats up the amorphous and then slowly cools it so that the area has time to anneal into its crystalline state. To change from crystalline to amorphous state, one increases the beam power density to a high level and then rapidly decreases the beam power. To read from the storage medium, a lower-energy beam strikes the storage area. An example of such type of material is germanium telluride (GeTe) and ternary alloys based on GeTe. Similar methods to modify states using laser beams as the heating source have been described in "Laser-induced Crystallization of Amorphous GeTe: A Time-Resolved Study," by Huber and Marinero, published in Physics Review B 36, page 1595, in 1987, and will not be further described here.

There are many preferred ways to induce a state change in storage medium 106. For example, a change in the topography of the medium, such as a hole or bump, will modify the SEEC and BEC of the storage medium. This modification occurs because the coefficients typically depend on the incident angle of the electron beam onto the storage area. Changes in material properties, band structure, and crystallography may also affect the coefficients. Also, the BEC depends on an atomic number, Z. Thus, one preferred storage medium has a layer of low Z material on top of a layer of high Z material or vice versa, with writing accomplished through ablating some of the top layer by an electron beam.

Figure 10:
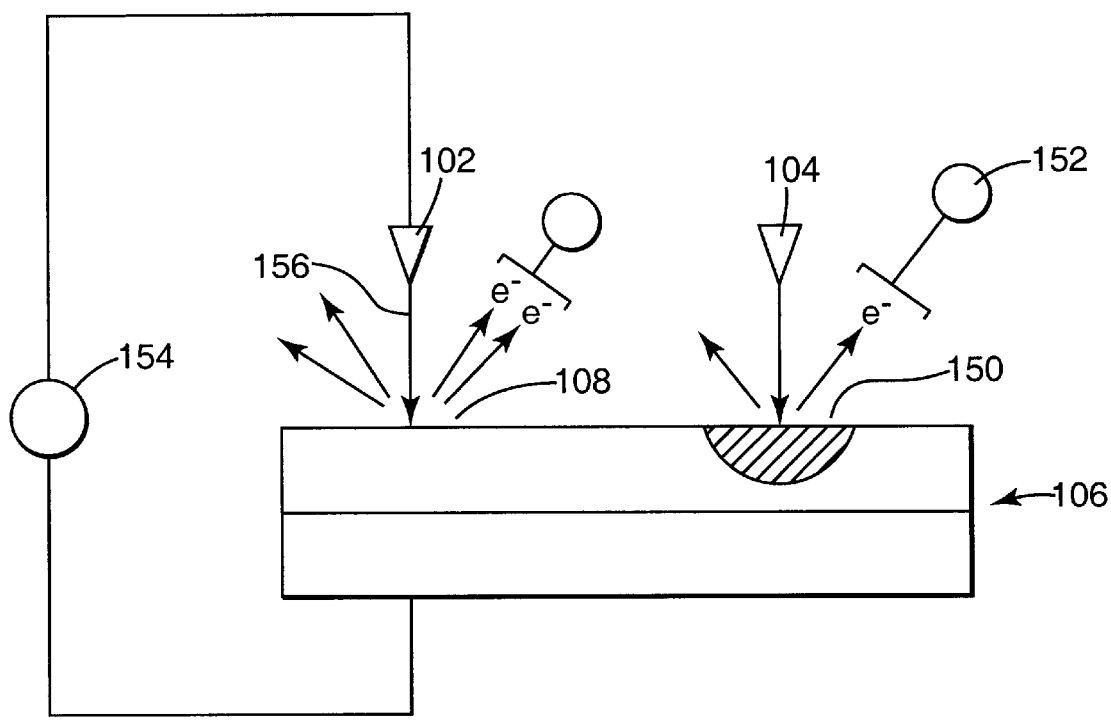
FIG. 10 is a diagram illustrating one exemplary embodiment of electron emitters reading from storage areas of the atomic resolution storage device of FIG. 7.

FIG. 10 shows schematically the electron emitters reading from storage medium 106. The state of storage area 150 has been altered, while the state of storage area 108 has not been altered. When electrons bombard a storage area, both secondary electrons and back-scattered electrons will be collected by the electron collectors, such as electron collector 152. An area that has been modified will produce a different number of secondary electrons and back-scattered electrons, as compared to an area that has not been modified. The difference may be more or may be less depending on the type of material and the type of modification. By monitoring the magnitude of the signal collected by electron collectors 152, one can identify the state of and, in turn, the bit stored in, the storage area.

Figure 11:
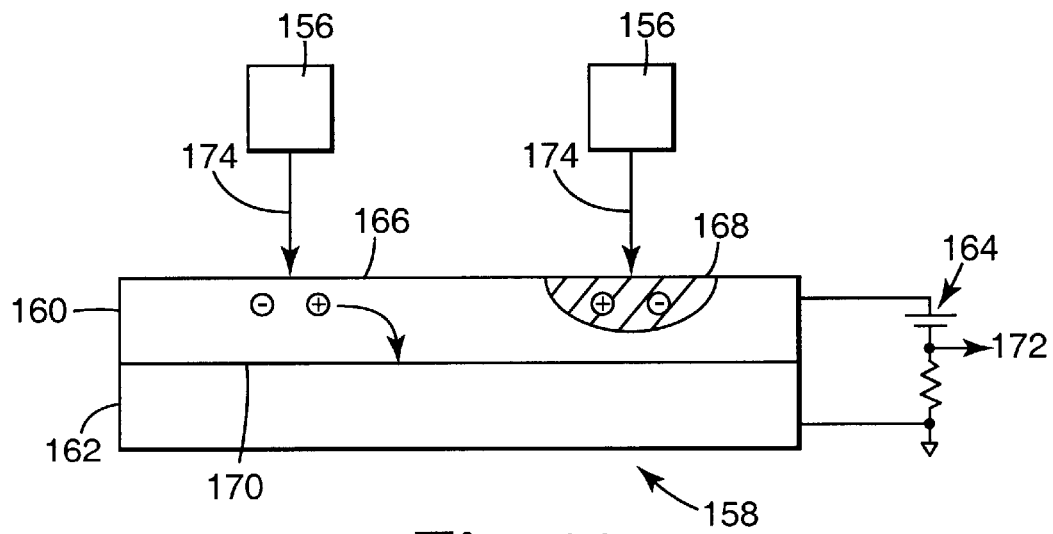
FIG. 11 is a diagram illustrating another exemplary embodiment of electron emitters reading from storage areas in a atomic resolution storage device according to the present invention.

In another reading approach, a diode structure is used to determine the state of the storage areas. According to this approach, the storage medium 158 is configured as a diode which can, for example, comprise a p-n junction, a schottky, barrier, or substantially any other type of electronic valve. FIG. 11 illustrates an example configuration of such a storage medium 158. It will be understood that alternative diode arrangements (such as those shown in U.S. Pat. No. 5,557,596) are feasible. As indicated in this figure, the storage medium 158 is arranged as a diode having two layers 160 and 162. By way of example, one of the layers is p type and the other is n type. The storage medium 158 is connected to an external circuit 164 that reverse-biases the storage medium. With this arrangement, bits are stored by locally modifying the storage medium 158 in such a way that collection efficiency for minority carriers generated by a modified region 166 is different from that of an unmodified region 168. The collection efficiency for minority carriers can be defined as the fraction of minority carriers generated by the instant electrons that are swept across a diode junction 170 of the storage medium 158 when the medium is biased by the external circuit 164 to cause a signal current 172 to flow through the external circuit.

In use, the electron emitters 156 emit narrow beams 174 of electrons onto the surface of the storage medium 158 that excite electron-hole pairs near the surface of the medium. Because the medium 158 is reverse-biased by the external circuit 164, the minority carriers that are generated by the incident electrons are swept toward the diode junction 170. Electrons that reach the junction 170 are then swept across the junction. Accordingly, minority carriers that do not recombine with majority carriers before reaching the junction 170 are swept across the junction, causing a current flow in the external circuit 164.

As described above, writing is accomplished by increasing the power density of electron beams enough to locally alter the physical properties of the storage medium 158. Where the medium 158 is configured as that shown in FIG. 11, this alteration affects the number of minority carriers swept across the junction 170 when the same area is radiated with a lower power density read electron beam. For instance, the recombination rate in a written (i.e., modified) area 166 could be increased relative to an unwritten (i.e., unmodified) area 168 so that the minority carriers generated in the written area have an increased probability of recombining with minority carriers before they have a chance to reach and cross the junction 170. Hence, a smaller current flows in the external circuit 164 when the read electron beam is incident upon a written area 166 than when it is incident upon an unwritten area 168. Conversely, it is also possible to start with a diode structure having a high recombination rate and to write bits by locally reducing the recombination rate. The magnitude of the current resulting from the minority carriers depends upon the state of particular storage area, and the current continues the output signal 172 to indicate the bit stored.

Figure 12:
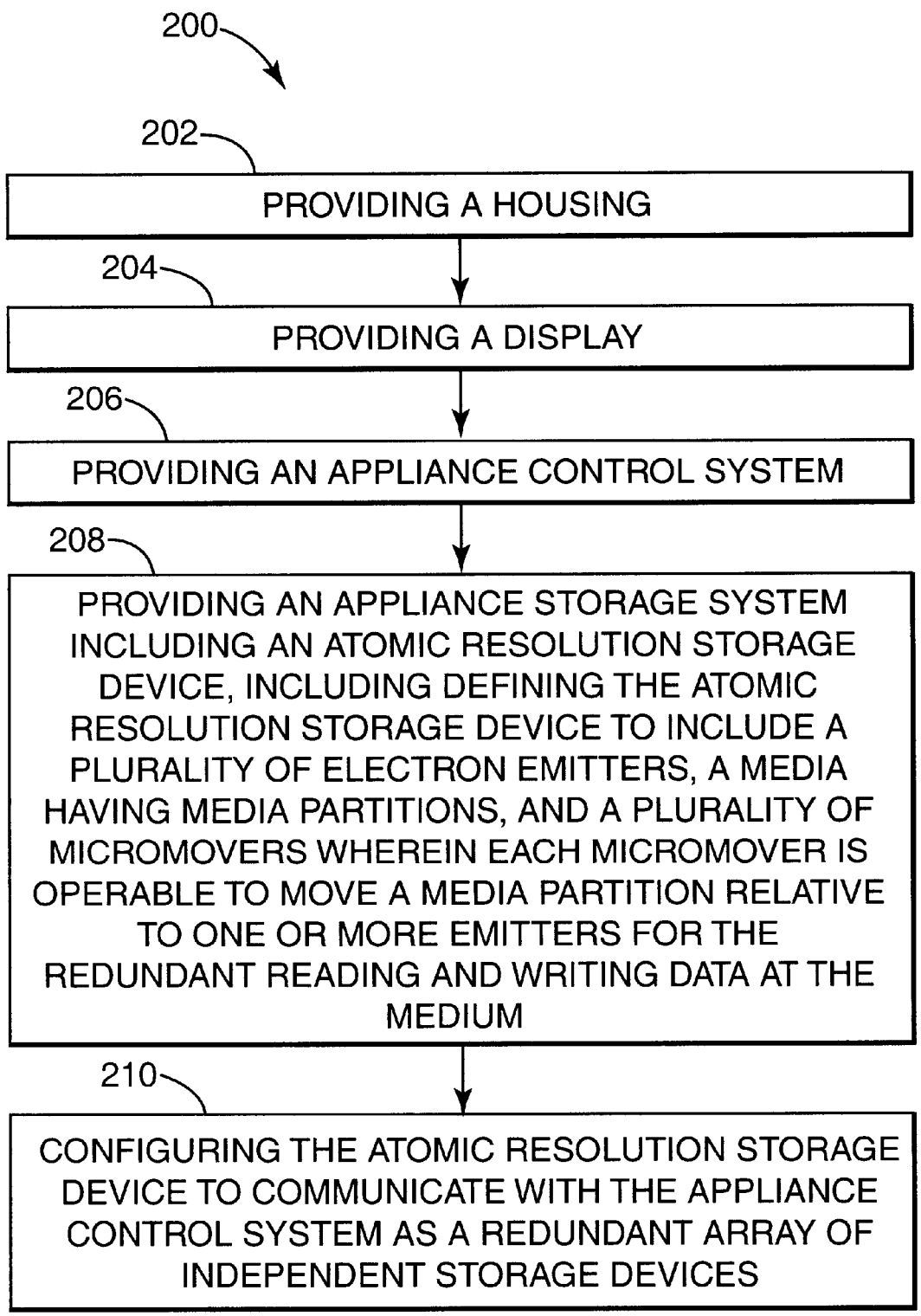
FIG. 12 is a block diagram illustrating one exemplary embodiment of a method of manufacturing an appliance according to the present invention.

In FIG. 12, a block diagram is shown generally at 200, illustrating one exemplary embodiment of a method of manufacturing an electronic appliance according to the present invention. In step 202, a housing is provided. In step 204, a display is provided. In step 206, an appliance control system is provided. In step 208, an appliance storage system is provided. The appliance storage system includes an atomic resolution storage device. The atomic resolution storage device is defined to include a plurality of electron emitters, a medium having medium partitions, and a plurality of micromovers wherein each micromover is operable to move a media partition relative to one or more electron emitter tips for the redundant reading and writing of data at the medium. In step 210, the atomic resolution storage device is configured to communicate with the appliance control system as a redundant array of independent storage devices. The method further comprises the step of making each atomic resolution storage device using a semiconductor manufacturing process.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A storage system comprising:
    a controller; and
    a single atomic resolution storage device on a single semiconductor unit configured to communicate with the controller as
        a redundant array of independent storage devices, wherein the atomic resolution storage device is a non-volatile memory component including a plurality of electron emitters, a media having media partitions, and a plurality of micromovers wherein each micromover is independently operable to move a media partition relative to one or more electron emitters for reading and writing data at the media, and wherein the controller provides redundant data storage at pairs of the media partitions.

2. The system of claim 1, further comprising a control system, wherein the atomic resolution storage device is responsive to a user input via the control system for reading and writing at the media.

3. The system of claim 1, wherein the atomic resolution storage device is approximately 1 centimeters wide by 1 centimeters long by 2 millimeters high.

4. The system of claim 1, wherein the atomic resolution storage device has a standby power requirement of less than 1 Watts.

5. The system of claim 1, wherein the atomic resolution storage device is configured to operate as a RAID LEVEL 1 storage device.

6. A data storage system comprising:
    a control system; and
    a plurality of atomic resolution storage devices configured to communicate with the control system as a redundant array of independent storage devices, each atomic resolution storage device including:
        an array of electron emitters fabricated by semiconductor microfabrication techniques capable of generating electron beams;
        a storage medium in proximity to the electron emitters and having storage areas in one of a plurality of states to represent the information stored in the storage are;
        a communications bus, wherein the atomic resolution storage devices are configured to communicate with the control system via the communications bus; and wherein the plurality of atomic resolution storage devices are located on a single silicon based unit.

7. The system of claim 6, wherein the control system is located on the silicon based unit.

8. The system of claim 6, wherein an effect is generated when the electron beam current bombards the storage area, wherein the magnitude of the effect depends on the state of the storage area, and wherein the information stored in the storage area is read by measuring the magnitude of the effect.

9. A method of manufacturing a redundant data storage system comprising:
providing a control system;
providing a storage system including a controller and a plurality of atomic resolution storage devices;
configuring the atomic resolution storage devices to communicate with the controller as a redundant array of independent storage devices; and
making the atomic resolution storage devices on a single silicon based unit using a semiconductor manufacturing process.

10. The method of claim 9, further comprising the step of defining an atomic resolution storage device controller associated with each atomic resolution storage device;
and executing a read or write command at the atomic resolution storage device via communication with the controller using the atomic resolution storage device controller.

11. The method of claim 9, further comprising defining each atomic resolution storage device to include an-electron emitters, and a storage medium including storage areas which are responsive to the electron emitters for changing a state of the storage area; and
a micromover associated with the storage medium for positioning the electron emitters relative to the storage areas for execution of a read or write command.

12. An electronic appliance comprising:
an appliance control system; and
a single atomic resolution storage device on a single semiconductor chip configured to communicate with the appliance control system as a redundant array of independent storage devices, wherein the atomic resolution storage device is a non-volatile memory component including a plurality of electron emitters, a media having media partitions, and a plurality of micromovers wherein each micromover is independently operable to move a media partition relative to one or more electron emitters for reading and writing data at the media, wherein the appliance control system provides redundant data storage at pairs of the media partitions.

13. The appliance of claim 12, further comprising a control system, wherein the atomic resolution storage device is responsive to a user input via the control system for reading and writing at the media.

14. The appliance of claim 13, wherein the control system is part of the appliance control system.

15. The appliance of claim 12, wherein the atomic resolution storage device is approximately 1 centimeters wide by 1 centimeters long by 2 millimeters high.

16. The appliance of claim 12, wherein the atomic resolution storage device has a power requirement of less than 1 watts.

17. The appliance of claim 12, wherein the atomic resolution storage device is configured to operate as a RAID LEVEL 1, RAID LEVEL 2, RAID LEVEL3, RAID LEVEL 4, RAID LEVEL 5, RAID LEVEL 6 or RAID LEVEL 7 storage device.

18. The appliance of claim 12, wherein electronic appliance is a personal digital assistant.

19. The appliance of claim 12, wherein the atomic resolution storage device has a storage capacity greater than 100 megabytes.

20. An electronic appliance comprising:
an appliance control system; and
a plurality of atomic resolution storage devices configured to communicate with the control system as a redundant array of independent storage devices, each atomic resolution storage device including:
an array of electron emitters fabricated by semiconductor microfabrication techniques capable of generating electron beams;
a storage medium in proximity to the electron emitters and having storage areas in one of a plurality of states to represent the information stored in the storage areas;
wherein the plurality of atomic resolution storage devices are located on a single silicon based unit.

21. The system of claim 20, further comprising a communications bus, wherein the atomic resolution storage devices are configured to communicate with the host via the communications bus.

22. The system of claim 20, wherein the control system is located on the silicon based unit.

23. The system of claim 20, wherein an effect is generated when an electron beam bombards the storage area, wherein the magnitude of the effect depends upon the state of the storage area, and wherein the information stored in a storage area is read by measuring the magnitude of the effect.

24. The system of claim 20, further comprising:
a plurality of storage areas on the storage medium, with each storage area being similar to the one recited in claim 23; and
a microfabricated mover in the storage device to position different storage areas to be bombarded by the electron beam.

25. The system of claim 24, further comprising:
a plurality of electron emitters, with each emitter being similar to the one recited in claim 23, the plurality of electron emitters being spaced apart, with each emitter being responsible for a number of storage areas on the storage medium; and
such that a plurality of the electron emitters can work in parallel to increase the data rate of the storage device.

26. The system of claim 20, further comprising an atomic resolution storage device controller associated with each atomic resolution storage device to define an atomic resolution storage system, wherein each atomic resolution storage device communicates with the control system via the atomic resolution storage device controller.

27. The system of claim 26, wherein the atomic resolution storage device controller is located on the atomic resolution storage device.

28. The system of claim 26, wherein the atomic resolution storage device controller is located separate from the atomic resolution storage device.

29. The system of claim 20, wherein the atomic resolution storage device controller includes a memory buffer to aid in transmitting data between the atomic resolution storage device and the control system.

30. An electronic appliance having a storage system including a controller comprising:

an appliance control system; and one or more atomic resolution storage devices logically connected to the controller via a communications bus, configured to communicate with the controller via the communications bus as a redundant array of independent storage devices, wherein each atomic resolution storage device further comprises:

an array of electron emitters capable of generating an electron beam;

a storage medium having a storage area capable of one or more states, wherein the storage area is responsive to one or more electron emitters to define the state of the storage area representative of information stored in the storage area; and a micromover for positioning the storage medium relative to the electron emitters wherein the plurality of atomic resolution storage devices are located on the same silicon based unit.

31. The system of claim 30, further comprising an atomic resolution storage device controller associated with each atomic resolution storage device controller communicates with the controller for execution of read and write commands at the atomic resolution storage device.

32. The system of claim 30, wherein each atomic resolution storage device is made using semiconductor microfabrication techniques.

33. A method of manufacturing an appliance comprising:

providing a housing;

providing an appliance control system;

providing an appliance storage system including a controller and a plurality of atomic resolution storage devices;

configuring the atomic resolution storage devices to communicate with the controller as a redundant array of independent storage devices;

making each atomic resolution storage device using a semiconductor manufacturing process; and making the plurality of atomic resolution storage devices on the same silicon based unit.

34. The method of claim 33, further comprising making the controller on the same silicon unit as the plurality of atomic resolution storage devices.

35. The method of claim 33, further comprising defining an atomic resolution storage device controller associated with each atomic resolution storage device; and executing a read or write command at the atomic resolution storage device via communication with the controller using the atomic resolution storage device controller.

36. The method of claim 33, further comprising defining each atomic resolution storage device to include an array of electron emitters, and a storage medium including a storage area which is responsive to the electron emitters for changing a state of the storage area; and a micromover associated with the storage medium for positioning the storage area relative to the electron emitters for execution of a read or write command.

37. A method of manufacturing an electronic appliance comprising:

providing a housing, providing an appliance control system;

providing an appliance storage system including a single atomic resolution storage device on a single semiconductor unit, including defining the atomic resolution storage device to include a plurality of electron emitters, a media having media partitions, and a plurality of micromovers wherein each micromover is operable to move a media partition relative to one or more electron emitters for the redundant reading and writing data at the media partitions; and configuring the atomic resolution storage device to communicate with the appliance control system as a redundant array of independent storage devices.

38. The method of claim 37, further comprising making the atomic resolution storage device using a semiconductor manufacturing process.

39. A storage system comprising:

a control system;

a communications bus, a plurality of atomic resolution storage systems configured to communicate with the control system as a redundant array of independent storage devices, each atomic resolution storage system comprising a device control system and an atomic resolution storage device; the control system provides for redundant data storage between pairs of atomic resolution storage systems, where each redundant pair of atomic resolution storage systems are physically located separate from each other, and are logically connected via the communications bus.

40. The system of claim 39, further where the control system and each atomic resolution storage system are located on a separate semiconductor chip.

41. The system of claim 39, wherein the control system is located physically separate from each atomic resolution storage system.

42. The system of claim 39, wherein each device control system is located on a common semiconductor chip with a corresponding atomic resolution storage device.

* * * * *